(12) United States Patent
Eiref et al.

(10) Patent No.: US 6,975,809 B1
(45) Date of Patent: Dec. 13, 2005

(54) METHOD AND APPARATUS FOR PASSING CLEAR DVD DATA IN A COMPUTER

(75) Inventors: Daniel Eiref, Cambridge, MA (US); Leon Hesch, Littleton, MA (US)

(73) Assignee: ATI International, S.R.L., Christchurch (BB)

( * ) Notice: Subject to any disclaimer, the term of this patent is extended or adjusted under 35 U.S.C. 154(b) by 1023 days.

(21) Appl. No.: 09/712,360

(22) Filed: Nov. 14, 2000

(51) Int. Cl.$^7$ ............................................. H04N 5/781
(52) U.S. Cl. ........................ 386/125; 386/111; 386/46
(58) Field of Search .............................. 386/27, 33, 46, 386/111, 109, 125, 126; 348/407.1, 461, 348/468; 345/556; 375/240.25

(56) References Cited

U.S. PATENT DOCUMENTS

| | | | |
|---|---|---|---|
| 5,450,549 A | * | 9/1995 | Casparian .................... 345/556 |
| 5,990,958 A | * | 11/1999 | Bheda et al. ............. 348/407.1 |
| 6,297,797 B1 | * | 10/2001 | Takeuchi et al. ............ 348/461 |
| 6,466,736 B1 | * | 10/2002 | Chen et al. .................. 386/126 |
| 6,704,361 B2 | * | 3/2004 | Bublil et al. ........... 375/240.23 |

* cited by examiner

Primary Examiner—James J. Groody
Assistant Examiner—Christopher Onuaku
(74) Attorney, Agent, or Firm—Vedder, Price, Kaufman & Kammholz, P.C.

(57) ABSTRACT

The system is for passing clear DVD program streams from a CPU (central processing unit) to an MPEG-2 decoder. In the system the CPU is connected to a first bus interface. A system memory is connected to the first bus interface via a memory bus. A second bus interface is connected to the first bus interface via a PCI (peripheral component interconnect) bus and a DVD data source is connected to the second bus interface. A packet data decoder is connected to the memory bus via a buffer. The CPU reads DVD data from the DVD data source across the PCI bus, decrypts the DVD data and creates a packet data, and sends the packet data to the buffer via the memory bus. The MPEG-2 decoder receives the packet data, via the transport bus, from the buffer. In more general terms, the system connects two existing busses in a computer of set-top box.

25 Claims, 2 Drawing Sheets

METHOD AND APPARATUS FOR PASSING CLEAR DVD DATA IN A COMPUTER

FIELD OF THE INVENTION

The invention relates generally to methods and devices for passing clear DVD data (such as, DVD program streams). The present invention encompasses, in the most general terms, methods and devices for passing any form of encrypted data from any source.

BACKGROUND OF THE INVENTION

DVD technology is well known in the prior art. The DVD specification allows for single or dual-layered DVDs, and single-sided or double-sided DVDs. A single sided, dual layer DVD holds almost 8.5 Gigabytes, or about 8 hours of quality video and multi-channel soundtrack.

DVDs compress video information using MPEG-2 (Motion Pictures Experts Group), to minimize the amount of data required for video. The specification allows for up to 480 horizontal lines of resolution. This results in picture quality virtually free of video noise with a high level of detail and color fidelity.

When a computer or set-top box is used to display movies from a DVD, the DVD data process over the PCI bus in the computer or set-top box. After the DVD data is read over the PCI bus from a DVD source, it is the decrypted by the CPU. The CPU then re-encrypts the data for transmission over the PCI bus to an MPEG-2 decoder.

Because of the large amount of data involved in DVD, it places great demands on the computer of set-top box in terms of processing time. Therefore, there is a need in the prior art for a more efficient method of processing DVD data that also reduces the number of required computations by the computer or set-top box.

BRIEF DESCRIPTION OF THE DRAWINGS

The features of the present invention which are believed to be novel are set forth with particularity in the appended claims. The invention, together with further objects and advantages, can best be understood by reference to the following description taken in conjunction with the accompanying drawings, in the several figures of which like reference numerals identify like elements.

DETAILED DESCRIPTION OF A PREFERRED EMBODIMENT OF THE INVENTION

Figure 1:
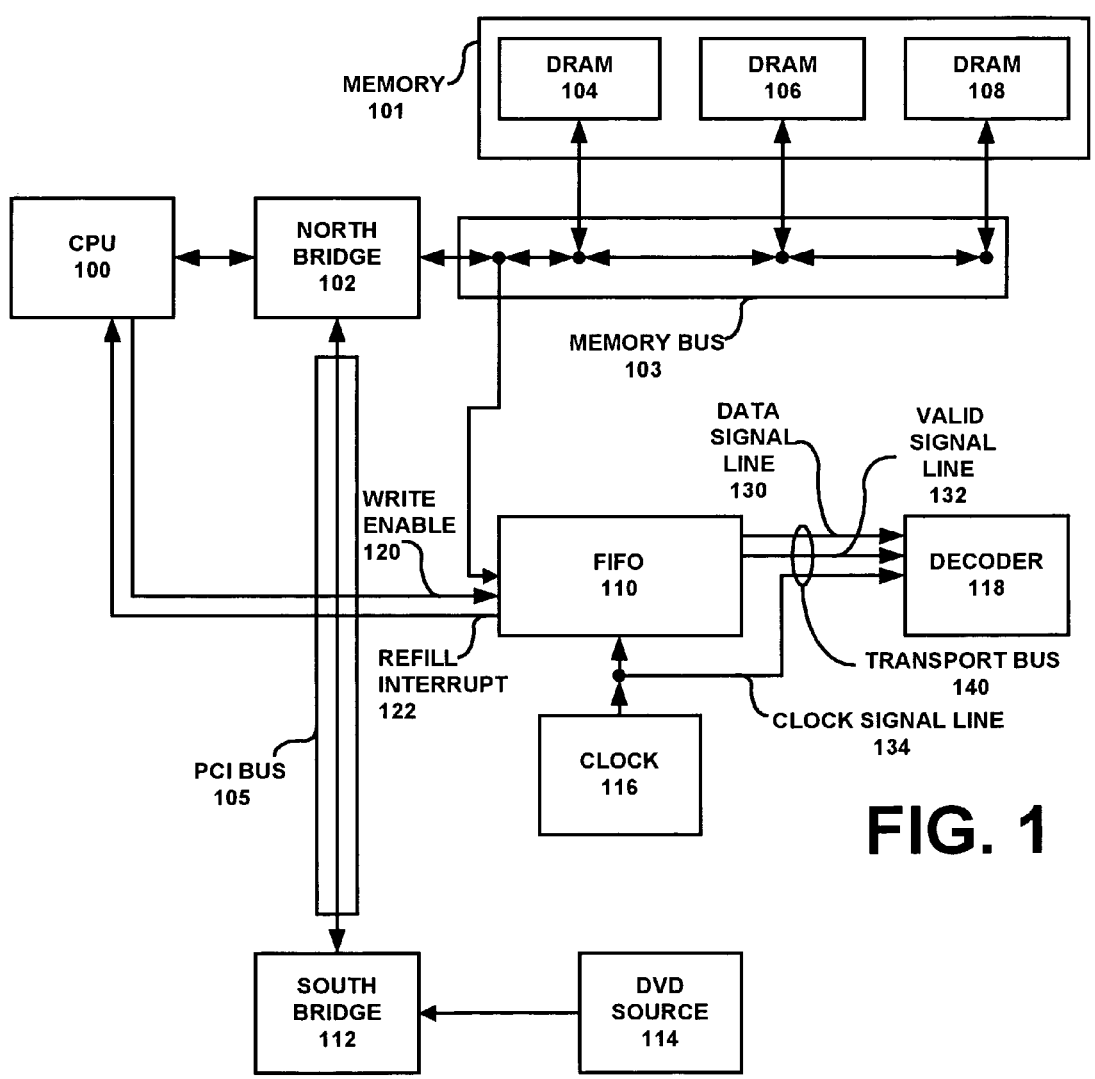
FIG. 1 is a block diagram illustrating a computer embodiment of the present invention.

In general terms the present invention is a system for passing clear DVD (digital video disk) program streams from a CPU (central processing unit) to an MPEG type decoder. In the system the CPU is connected to a first bus interface. A system memory is connected to the first bus interface via a memory bus. A second bus interface is connected to the first bus interface via a PCI (peripheral component interconnect) bus and a DVD data source is connected to the second bus interface. A packet data decoder is connected to the memory bus via a buffer. The CPU reads DVD data from the DVD data source across the PCI bus, decrypts the DVD data and creates packet data, and sends the packet data to the buffer via the memory bus. The MPEG type decoder receives the packet data, via the transport bus from the buffer. In more general terms, the present invention is a novel way of connecting two existing busses in a computer of set-top box.

A typical computer or set-top box has a central processing unit connected to a memory bus and a PCI bus by a north bridge, otherwise referred to as the host/PCI bridge, which is quad-ported. The CPU can read and write main memory, permitting a graphics device driver executing on the processor to access and manipulate graphics information stored in main memory that will be used by a graphics adapter. The processor can read and write an AGP graphics adapter's local memory and register set. This permits the graphics device driver executing on the processor to access and manipulate graphics information stored in the graphics adapter's local memory, and to control the adapter via its register set. The graphics adapter can read and write main memory. The graphics adapter doesn't have to keep all of the graphics information in its local memory. Rather, on an as-needed basis, its device driver can request that the operating system allocate some main memory for its use. The graphics adapter can then use its dedicated AGP bus into its assigned area of main memory for the storage and manipulation of graphics information.

DVD source data is compressed as it moves from a storage device over the PCI bus to main memory, and the bandwidth requirements remain modest. This is necessary because the PCI bus is a busy place and failure to keep up with video streaming cannot be tolerated. Once the compressed data is in main memory, it can then be transferred to an MPEG-2 decoder and displayed.

The peripheral component interconnect (PCI) is a popular high-bandwidth, processor-independent bus that can function as a peripheral bus. Compared with other common bus specifications, PCI delivers better system performance for high-speed I/O subsystems (e.g., graphic display adapters, network interface controllers, disk controllers, and so on). The current standard allows the use of up to 64 data lines at 66 MHz, for a raw transfer rate of 528 MByte/s, or 4.224 Gbps. But it is not just a high speed that makes PCI attractive. PCI is specifically designed to meet economically the I/O requirements of modem systems; it requires very few chips to implement and supports other buses attached to the PCI bus.

Figure 2:
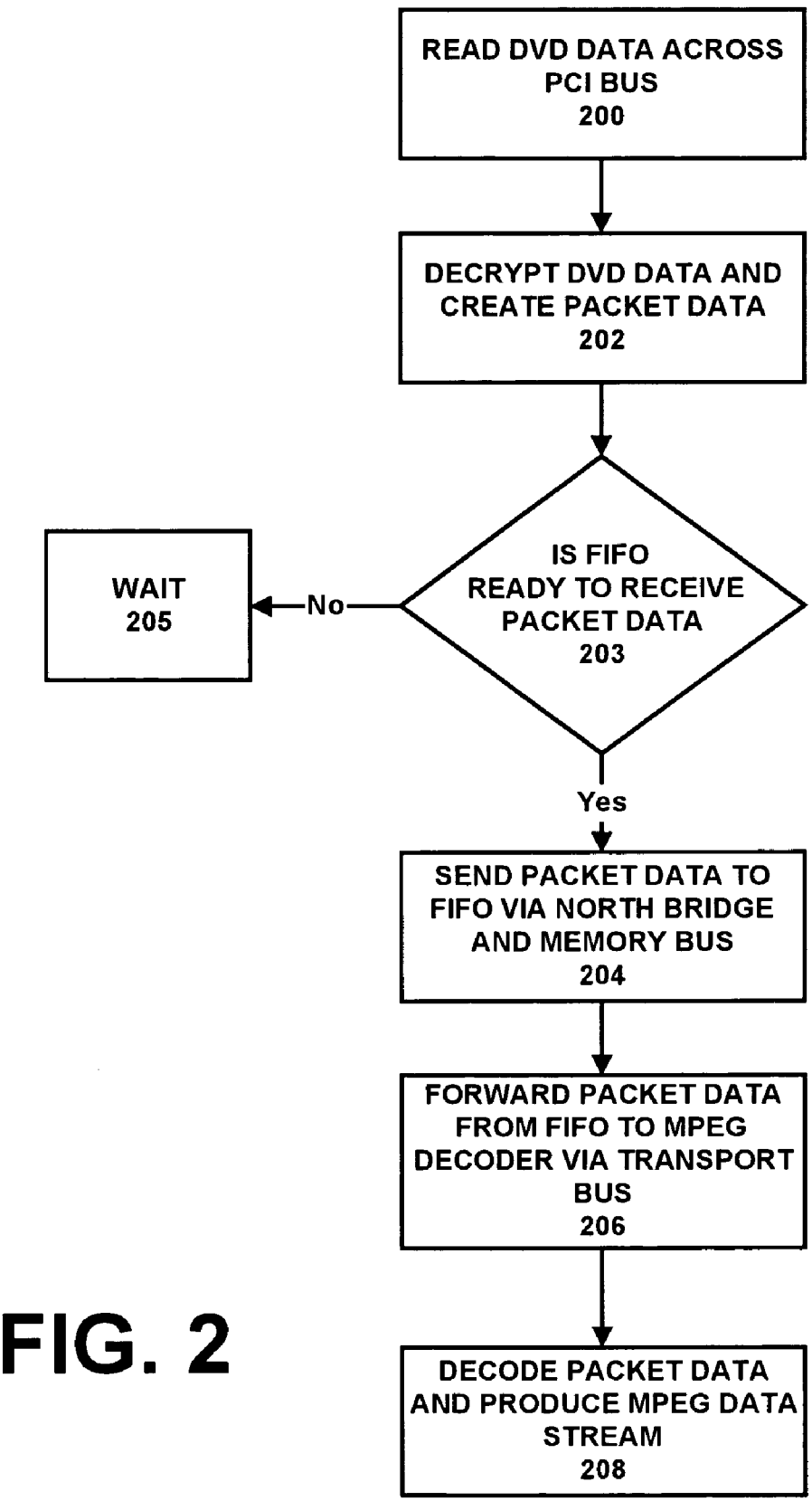
FIG. 2 is a flowchart of the method of the present invention.

The present invention is depicted as a block diagram in FIG. 1 and as a flow chart in FIG. 2. The present invention has general applicability, but is most advantageously used in a computer or set-top box. Inventively, in the computer or set-top box the system memory bus is connected to the transport stream input of the MPEG type decoder (e.g. MPEG-2). The CPU writes program streams directly from the memory bus to the MPEG-2 decoder, thus avoiding the PCI bus, and thus requiring less computations and greater efficiency. Generally, some type of buffering is required to de-couple the CPU from the MPEG-2 decoder. The buffering is preferably FIFO (First In, First Out) element located either externally to the MPEG-2 decoder, or located in the MPEG-2 decoder's frame buffer.

FIG. 1 is a block diagram of the relevant portions of a computer for illustrating the present invention. The present invention is a system for passing clear DVD program streams from a CPU 100 to a decoder 118. The CPU 100 is connected to a first bus interface 102, referred to in the art as the north bridge. The present invention further encompasses the CPU 100 and the first bus interface 102 being integrated into a single chip. The system memory 101 is connected to the first bus interface 102 via a memory bus 103. The system bus 101 is typically formed from a plurality of dynamic random access memories (DRAM) 104, 106, 108. A second bus interface 112 is connected to the first bus interface 102 via a PCI bus 105. The second bus interface is generally referred to as the south bridge. A DVD data source 114 is connected to the second bus interface 112. The CPU 100 and the second bus interface 112 can also be integrated into a single chip.

A packet data decoder 118 is connected to the memory bus 103 via a buffer 110, such as a FIFO element. The CPU 100 reads DVD data from the DVD data source 114 across the PCI bus 105 and the north and south bridges 102, 112. The CPU 100 then decrypts the DVD data and creates packet data. The packet data is the sent to the buffer 110 via the memory bus 103. The decoder 118 receives the packet data, via the transport bus 140, from the buffer 110. The transport bus 140 consists of at least data lines 130, valid signal line 132, and clock line 134.

In one embodiment of the present invention the buffer 110 is a FIFO (first in first out) element. The FIFO element 110 generates a refill request interrupt on line 122 when the FIFO element 110 reaches a predetermined "almost empty" state. The CPU 100 forwards further packet data to the FIFO element 110 when the CPU 100 detects the refill request interrupt. The CPU 100 also is connected to the FIFO element 110 by a write enable line, which controls the write operation of the FIFO element 110.

The system further includes a free running clock 116 connected to the buffer 110 and to the decoder 118 for clocking the packet data out of the buffer 110. In a preferred embodiment the packet data is clocked out of the buffer in a range of 10 Mb/sec to 60 Mb/sec.

The method of the present invention is depicted in FIG. 2. In a first step for passing clear DVD program streams from a CPU to an MPEG-2 decoder the CPU reads DVD data from a DVD drive or source across a PCI bus. The CPU decrypts the DVD data and creates packet data therefrom in step 202. The packet data is then sent to the FIFO element via the north bridge and the memory bus. The CPU write enables the FIFO and then sends the packet data. In step 203 it is determined if the FIFO element is ready to receive packet data. Packet data is sent until the FIFO element is full. When the FIFO element is "full", the CPU waits to send more packet data (step 205). When the FIFO element is "almost empty" (a predetermined empty level), a refill request interrupt or signal is sent to the CPU. Upon receiving the refill request, the CPU sends additional packet data (step 204). After all packet data has been sent and the FIFO element is empty, an empty signal is sent from the FIFO element to the MPEG-2 decoder. The packet data is sent from the FIFO element, via a transport bus, to the MPEG-2 decoder in step 206. The data is clocked out of the FIFO element with a free running clock in the range of 10 Mb/sec to 60 Mb/sec. Finally, in step 208 the packet data is decoded and the MPEG-2 data stream is produced. The MPEG-2 data stream is then processed to display the video content as is known in the art.

Therefore, the present invention overcomes the drawbacks of the prior art for a more efficient method of processing DVD data that also reduces the number of required computations by the computer or set-top box. The present invention also provides an advantage over the prior art in that clear DVD, as well as, other previously encrypted transport or program streams are not sent across the PCI bus.

The present invention is not limited to the particular details of the apparatus and method depicted and other modifications and applications are contemplated. Certain other changes may be made in the above-described method and apparatus without departing from the true spirit and scope of the invention herein involved. For example, other types of decoders, other than MPEG, can be used with the present invention. Furthermore, future versions of MPEG decoders, other than MPEG-2 can be used with the present invention. It is intended, therefore, that the subject matter of the present invention shall be interpreted as illustrative and not in a limiting sense.

What is claimed is:

1. A method for passing clear DVD program streams from a CPU (central processing unit) to an MPEG-2 decoder, comprising the steps of:
    reading, via a CPU, DVD data from a DVD drive across a PCI (peripheral component interconnect) bus;
    decrypting the DVD data in the CPU and creating packet data;
    sending the packet data to a FIFO (first in first out) element via a memory bus;
    forwarding the packet data from the FIFO element, via a transport bus, to an MPEG-2 decoder.

2. The method according to claim 1, wherein the FIFO element generates a refill request interrupt when the FIFO element reaches a predetermined "almost empty" state.

3. The method according to claim 2, wherein CPU forwards further packet data to the FIFO element when the CPU detects the refill request interrupt.

4. The method according to claim 1, wherein the method further includes clocking the data out of the FIFO element with a free running clock.

5. The method according to claim 4, wherein the packet data is clocked out of the FIFO element in a range of 10 Mb/sec to 60 Mb/sec.

6. A method for passing clear DVD program streams from a CPU (central processing unit) to an MPEG type decoder, comprising the steps of:
    decrypting the DVD data in the CPU and creating packet data;
    sending the packet data to a buffer via a memory bus;
    forwarding the packet data from the buffer, via a transport bus, to an MPEG type decoder.

7. The method according to claim 6, wherein the MPEG type decoder is an MPEG-2 decoder.

8. The method according to claim 6, wherein the buffer is a FIFO (first in first out) element.

9. The method according to claim 8, wherein the FIFO element generates a refill request interrupt when the FIFO element reaches a predetermined "almost empty" state.

10. The method according to claim 9, wherein CPU forwards further packet data to the FIFO element when the CPU detects the refill request interrupt.

11. The method according to claim 6, wherein the method further includes clocking the data out of the FIFO element with a free running clock.

12. The method according to claim 11, wherein the packet data is clocked out of the FIFO element in a range of 10 Mb/sec to 60 Mb/sec.

13. A system for passing clear DVD program streams from a CPU (central processing unit) to a decoder, comprising:
    a CPU connected to a first bus interface;
    system memory connected to the first bus interface via a memory bus;
    a second bus interface connected to the first bus interface via a PCI (peripheral component interconnect) bus;
    a DVD data source connected to the second bus interface; and a packet data decoder connected to the memory bus via a buffer;

wherein the CPU reads DVD data from the DVD data source across the PCI bus, decrypts the DVD data and creating packet data, sends the packet data to the buffer via the memory bus, and wherein the decoder receives the packet data, via the transport bus, from the buffer.

14. The system according to claim 13, wherein the buffer is a FIFO (first in first out) element.

15. The system according to claim 14, wherein the FIFO element generates a refill request interrupt when the FIFO element reaches a predetermined "almost empty" state.

16. The system according to claim 15, wherein CPU forwards further packet data to the FIFO element when the CPU detects the refill request interrupt.

17. The system according to claim 13, wherein the system further includes a free running clock connected to the buffer for clocking the packet data out of the buffer.

18. The system according to claim 17, wherein the packet data is clocked out of the buffer in a range of 10 Mb/sec to 60 Mb/sec.

19. A set-top box that passes clear DVD program streams from a CPU (central processing unit) to an MPEG type decoder, comprising:

a CPU connected to a first bus interface;

system memory connected to the first bus interface via a memory bus;

a second bus interface connected to the first bus interface via a PCI (peripheral component interconnect) bus;

a DVD data source connected to the second bus interface; and an MPEG type decoder connected to the memory bus via a buffer;

wherein the CPU reads DVD data from the DVD data source across the PCI bus, decrypts the DVD data and creates packet data, sends the packet data to the buffer via the memory bus, and wherein the MPEG type decoder receives the packet data, via the transport bus, from the buffer.

20. The set-top box according to claim 19, wherein the buffer is a FIFO (first in first out) element.

21. The set-top according to claim 20, wherein the FIFO element generates a refill request interrupt when the FIFO element reaches a predetermined "almost empty" state.

22. The set-top according to claim 21, wherein CPU forwards further packet data to the FIFO element when the CPU detects the refill request interrupt.

23. The set-top according to claim 19, wherein the system further includes a free running clock connected to the buffer for clocking the packet data out of the buffer.

24. The set-top according to claim 23, wherein the packet data is clocked out of the buffer in a range of 10 Mb/sec to 60 Mb/sec.

25. The set-top according to claim 19, wherein the MPEG type decoder is an MPEG-2 decoder.

* * * * *